(12) United States Patent
Burke et al.

(10) Patent No.: US 8,949,051 B2
(45) Date of Patent: Feb. 3, 2015

(54) APPARATUS AND METHOD FOR SUB-METERING OF HOUSEHOLD DEVICES

(75) Inventors: William Jerome Burke, Louisville, KY (US); Robert Marten Bultman, Louisville, KY (US)

(73) Assignee: General Electric Company, Schenectady, NY (US)

( * ) Notice: Subject to any disclaimer, the term of this patent is extended or adjusted under 35 U.S.C. 154(b) by 769 days.

(21) Appl. No.: 13/198,417

(22) Filed: Aug. 4, 2011

(65) Prior Publication Data

US 2013/0035884 A1 Feb. 7, 2013

(51) Int. Cl.
*H02J 13/00* (2006.01)
*G01D 1/00* (2006.01)
(Continued)

(52) U.S. Cl.
CPC ............ *G01D 4/002* (2013.01); *G06F 17/60* (2013.01); *H02J 13/00* (2013.01); *G06F 11/3065* (2013.01);
(Continued)

(58) Field of Classification Search
CPC ........ G01D 1/00; G01D 4/00; G01D 4/002; G01D 7/00; G01D 9/00; G01D 21/00; G01R 13/00; G01R 29/00; G05B 11/00; G05B 15/00; G05B 15/02; G05B 99/00; G06F 9/00; G06F 11/00; G06F 11/30; G06F 11/3055; G06F 11/3065; G06F 11/32; G06F 11/34; G06F 11/3409; G06F 11/3419; G06F 11/3423; G06F 17/00; G06F 17/40; G06F 17/60; G06F 19/00; G06F 2009/00; G06F 2011/00; G06F 2201/00; G06F 2201/875; G06F 15/00; G06F 15/06; G06F 17/10; G06Q 99/00; H02J 3/00; H02J 3/12; H02J 3/14; H02J 13/00; H02J 13/0006; H02J 13/0013; H02J 13/0017; H02J 13/0062; H02J 13/0075; H02J 13/0079; H02J 2003/00; H02J 2003/12; H02J 2003/14; H02J 2003/143; Y02B 70/00; Y02B 70/30; Y02B 70/32; Y02B 70/3208; Y02B 70/3225; Y02B 90/00; Y02B 90/20; Y02B 90/24; Y02B 90/241; Y04S 20/00; Y04S 20/20; Y04S 20/22; Y04S 20/222; Y04S 20/24; Y04S 20/242; Y04S 20/30; Y04S 20/32; Y04S 20/38; Y04S 20/40
USPC ........... 73/432.1, 865.8, 866.3; 236/1 R, 1 C; 237/2 R, 2 A, 12, 81; 324/76.11, 103 R, 324/115; 340/500, 540, 635, 653, 657; 700/1, 9, 11, 12, 83, 90, 275, 276, 286, 700/291, 295; 702/1, 57, 60, 61, 127, 182, 702/187, 188, 189; 705/1.1, 7.11, 400, 412
See application file for complete search history.

(56) References Cited

U.S. PATENT DOCUMENTS

3,602,703 A * 8/1971 Polenz .......................... 700/291
4,120,031 A * 10/1978 Kincheloe et al. ............ 705/412
(Continued)

*Primary Examiner* — Edward Cosimano
(74) *Attorney, Agent, or Firm* — GE Global Patent Operation; Marc A. Vivenzio (57) ABSTRACT

An apparatus and method for estimating resource consumption of a household device, e.g., an appliance. The method comprises determining a resource demand profile for a household device for a given time period, the resource demand profile associating, for the given time period, a device state of the household device with a total resource demand for the household. In one embodiment, the apparatus can be incorporated into an energy management system, where the apparatus collects data from each of the appliances in a household as well as from a resource meter.

20 Claims, 5 Drawing Sheets

(51) Int. Cl.
    *G06F 17/40*     (2006.01)
    *G06F 19/00*     (2011.01)
    *G01D 4/00*     (2006.01)
    H02J 3/14     (2006.01)
    *G06F 17/00*     (2006.01)
    *G06F 11/30*     (2006.01)

(52) U.S. Cl.
CPC ............... *G06F 19/00* (2013.01); *G06F 17/40* (2013.01); *G01D 1/00* (2013.01); H02J 3/14 (2013.01); *H02J 13/0062* (2013.01); *H02J 13/0075* (2013.01); *H02J 13/0079* (2013.01); *H02J 2003/143* (2013.01); *Y02B 70/3225* (2013.01); *Y02B 90/241* (2013.01); *Y04S 20/222* (2013.01); *Y04S 20/32* (2013.01); *Y04S 20/38* (2013.01); *Y02B 70/3266* (2013.01); *Y02B 90/2653* (2013.01); *Y02B 90/2638* (2013.01); *Y04S 20/242* (2013.01); *Y04S 40/124* (2013.01); *Y04S 40/126* (2013.01)

USPC .............. 702/61; 73/865.8; 73/866.3; 700/83

(56) References Cited

U.S. PATENT DOCUMENTS

| | | | | |
|---|---|---|---|---|
| 4,675,828 | A | * | 6/1987 | Winston ........................ 700/286 |
| 5,566,084 | A | * | 10/1996 | Cmar ............................ 700/276 |
| 5,930,773 | A | * | 7/1999 | Crooks et al. ................... 705/30 |
| 5,943,656 | A | * | 8/1999 | Crooks et al. ................... 705/30 |
| 6,035,285 | A | * | 3/2000 | Schlect et al. .................. 705/30 |
| 6,052,671 | A | * | 4/2000 | Crooks et al. ................... 705/34 |
| 6,088,688 | A | * | 7/2000 | Crooks et al. .................. 705/412 |
| 7,181,293 | B2 | | 2/2007 | Rothman et al. |
| 2010/0211233 | A1 | | 8/2010 | Roscoe et al. |

* cited by examiner

APPARATUS AND METHOD FOR SUB-METERING OF HOUSEHOLD DEVICES

BACKGROUND

1. Field of the Invention

The subject matter of the present disclosure relates to energy management for home and household use and, more particularly, to embodiments of an apparatus and method that can determine resource consumption of household devices without direct measurement of the resource the household device consumes.

2. Description of Related Art

Home owners and other consumers of electrical power desire efficient energy management systems that can help reduce costs and peak demand to provide more efficient energy use. Various measures have been developed to address energy management goals. For example, energy efficient devices and appliances enable consumers to reduce energy consumption. In addition, utilities provide some consumers with direct control for certain electrical loads, such as heating or cooling devices, pool pumps, and so on, to allow utilities to control energy and power usage. Also, some utilities implement demand response programs for residential as well as industrial consumers in order to provide reduced peak demand requirements and to effectively manage energy consumption. While these and other developments are available and enable consumers to manage power consumption, intelligent systems that monitor and manage consumption and effectively communicate information to the consumer are still being developed.

BRIEF SUMMARY OF THE INVENTION

The present disclosure describes an apparatus and methods that determine resource (e.g., electricity, gas, water, etc.) consumption for a household device without the need to measure the actual resource that the household device consumes. These methods permit sub-metering of household devices without the need to add additional sensing and monitoring hardware to the appliances and/or to devices and systems that may reside in the household for such purposes. When implemented in conjunction with various home energy management systems, the methods provide a powerful tool for end users to understand how the consumer uses resources, to predict future resource consumption and behavior, and, ultimately, to save energy and money.

Other features and advantages of the disclosure will become apparent by reference to the following description taken in connection with the accompanying drawings.

BRIEF DESCRIPTION OF THE DRAWINGS

Reference is now made briefly to the accompanying drawings, in which.

Where applicable like reference characters designate identical or corresponding components and units throughout the several views, which are not to scale unless otherwise indicated.

DETAILED DESCRIPTION OF THE INVENTION

Broadly stated, the present disclosure describes subject matter that can determine a resource demand profile for a household device using the total resource demand for the household and changes in operating states of the household device and/or elements associated with the household device. The resource demand profile can comprise resources such as electricity, gas, water, among other resources that the household and its appliances consume. Thus in lieu of hardware that would collect discrete data about resource consumption directly from the household device, the inventive apparatus and methods simplify the collection and analysis of data indicative of resource consumption by, in one example, focusing on the relative changes in the operation of the household device, e.g., when the household device is on or off. In one embodiment, the method utilizes an input from an element, such as a relay switch, that exhibits a plurality of operating states (also "device states"). The operating states may identify, among other things, when the household device is on or off. For example, the plurality of operating states may reflect any condition of the household device, e.g., low power states, high power states, etc., in which the household device operates in a distinctive or different manner than in other states that the element (e.g., a relay switch) may reflect. For a relay switch, the input may reflect discrete voltage levels that distinguish between the plurality of states and, in particular, between a first state and a second state. As discussed more below, the method can use the change in voltage levels to identify when the household device is in operation and further to correlate the operation to the total resource demand to determine the resource demand profile for the household device.

Figure 1:
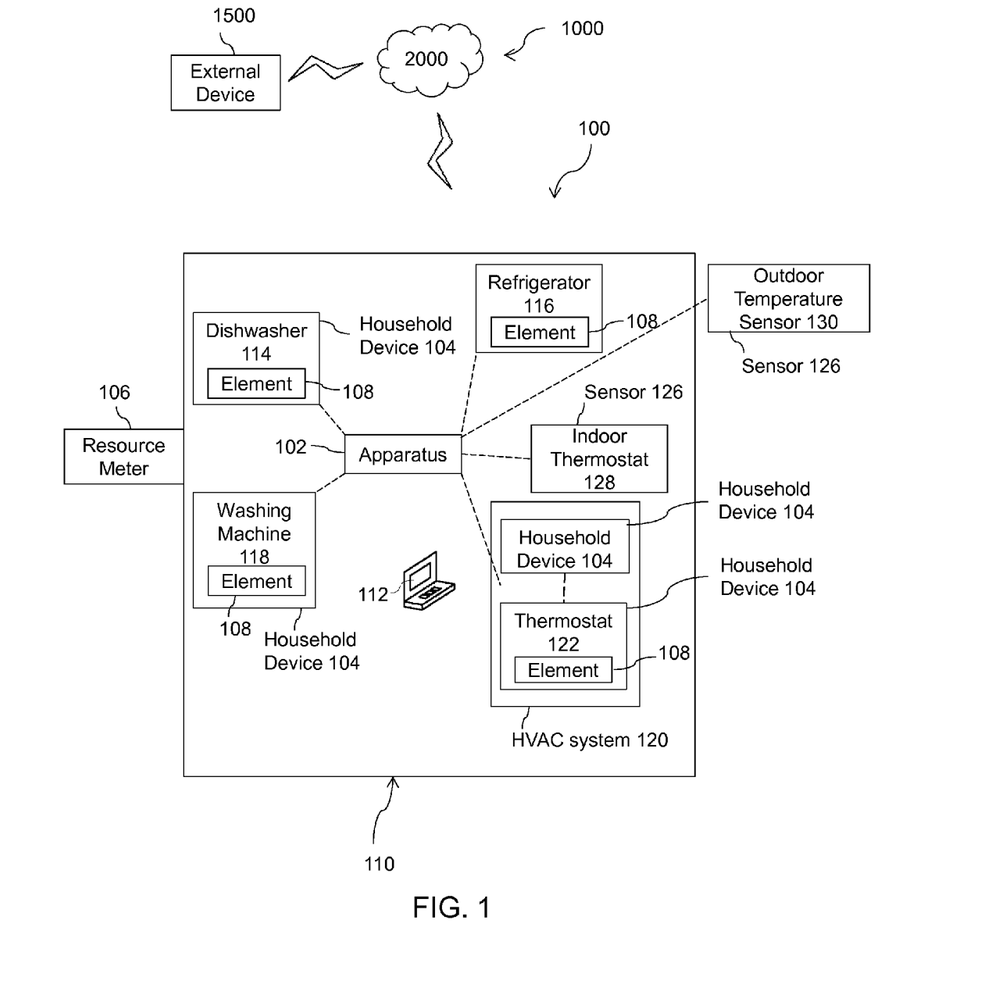
FIG. 1 depicts a schematic diagram of an energy management system.

Referring now to the drawings, FIG. 1 illustrates a management system 100 with an apparatus 102 (also "remote apparatus 102") that communicates, either directly or indirectly, with one or more household devices 104 and a resource meter 106 (e.g., a power meter, a water meter, etc.). The household devices 104 may comprise an element 108 that changes state (e.g., from a first state to a second state) as described above. The system 100 may be part of a network system 1000, which has in one example one or more external devices 1500 (e.g., an external server) coupled via a network 2000.

FIG. 1 also illustrates a computing device 110 (e.g., a computer, PDA, smartphone, etc.), which an end user can use to interface with the energy management device 102 via, e.g., a graphical user interface 112. The household devices 104 may comprise, among other devices, a dishwasher 114, a refrigerator 116, and a washing machine 118. The household devices 104 may also comprise an HVAC system 120 with a thermostat 122 that controls and operates the components of the HVAC system 120. The components of the HVAC system 120 may also comprise blower, compressors, and the like. The management system 100 may also comprise one or more sensors 126, e.g., an indoor temperature sensor 128 and an outdoor temperature sensor 130. The sensors 126 can provide inputs to the control device 102, which are used in implementations of the various methods and algorithms discussed below.

Generally the management system 100 may have features and functions similar to energy management ("EM") systems that provide information and feedback to the end user about energy performance, e.g., in the home. EM systems provide useful information to inform the end user about resource consumption. More sophisticated EM systems may, additionally, facilitate changes in operation of one or more of the household devices 104 based, at least in part, on the data related to resource consumption both for the household in total as well as for the household devices individually. Thus embodiments of the management system 100 stand to benefit from the apparatus and methods that permit estimation of resource usage without the need to directly measure resource consumption at the device level.

Discussing the apparatus 102 at a high level, the apparatus 102 acts as a central hub of the EM system 100. The apparatus 102 can interface with the household devices 104 to collect and gather data and, in some cases, exchange inputs and outputs with the household devices 104. These inputs and outputs may influence operation of the household devices 104. For example, the apparatus 102 can communicate a first output that activates the household device 104 such as to activate a fan on the blower in the HVAC system 120.

The apparatus 102 can also communicate with the resource meter 106, which in one example receives power (e.g., electricity) before the power reaches the house. The resource meter 106 records and monitors the resource consumption and usage rates for the household. In one embodiment, the resource meter 106 can exchange inputs and outputs with the apparatus 102, and vice versa. For example, the apparatus 102 can query the resource meter 106 for data related to resource usage and/or record such data into memory (not shown).

In some configurations, the apparatus 102 can also interface with the network system 1000 to receive and/or distribute information and data with the external servers 1500 via the network 2000. The network system 100 can store data such as resource consumption data on the external servers 1500 or other external storage devices and "cloud-based" computing networks. In one example, executable instructions (e.g., software and firmware) that encode or otherwise embody all or parts of the methods and algorithms discussed below can also reside external to the apparatus 102. Communication with the network 2000, as well as within the system 100, can occur via wired and or wireless communication using known and/or standard communication protocols (e.g., BLUETOOTH ®, WIFI, 802.11, RF, ZIGBEE, etc.).

The computing device 110 can provide a graphical user interface (GUI) or other display by which the end user can interface with the apparatus 102 and the resource meter 106, as well as other parts of the system 100 and network 2000. The end user can, in one example, utilize the computing device 110 to display the resource demand profile for one or more of the household devices 104. In one embodiment, the end user can manipulate the resource demand profile such as by selecting and/or choosing different settings, e.g., sampling rate of the data, time periods for the given time periods, and selecting different data sets for analysis, e.g., selecting among the household devices 104.

As discussed above, each of the household devices 104 may comprise elements (e.g., the element 108) that can identify the operating state of the household device 104. The element 108 can be a switch (e.g., a relay switch), the operation of which changes between a high voltage (e.g., +5 V) to a low voltage (e.g., 0 V or −5V) to distinguish between the on-state and the off-state of the household device 104. The element 108 can also comprise other discrete components of the household device 104 such as a transistor, resistor, or capacitor. In other examples, the element 108 may be a sensor (including sensors 126) that measures operating parameters (e.g., temperature, pressure, rotation) for the household device 104. These operating parameters may provide sufficient indication of operation of the household device 104 to determine resource consumption as discussed in connection with FIGS. 2, 3, and 4 below.

Figure 2:
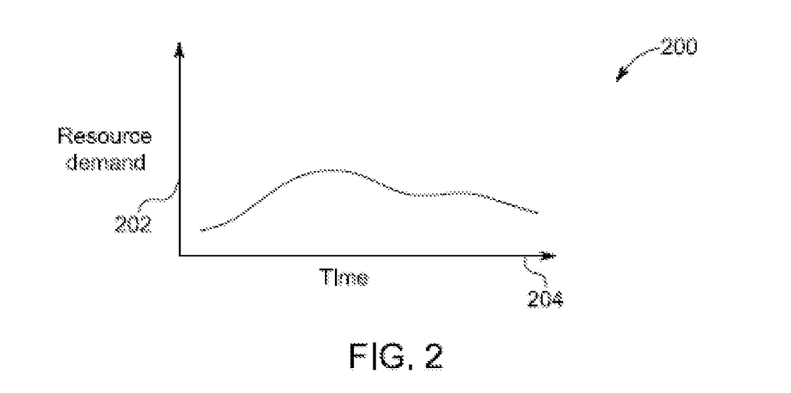
FIG. 2 depicts a graph of a resource demand profile for a household device.
Figure 3:
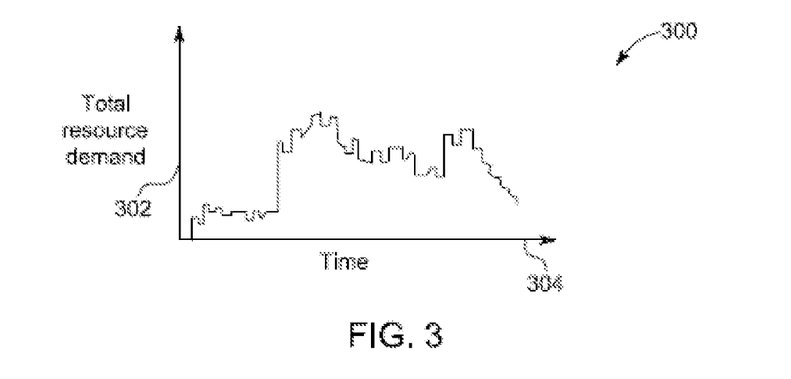
FIG. 3 depicts a graph of a total resource demand profile for a household.
Figure 4:
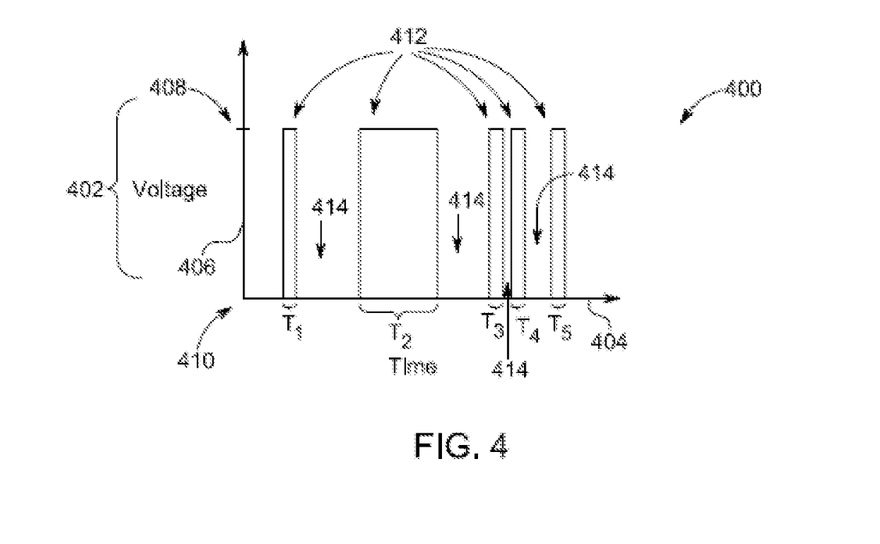
FIG. 4 depicts a graph of an operating profile for a household device.

FIGS. 2, 3, and 4 illustrate separate graphs with three exemplary profiles of data that vary over a given time period. FIG. 2 illustrates an example of a resource demand profile 200 for a household device. The resource demand profile 200 defines values of a device resource demand 202 for the household device for a given time period 204. FIG. 3 illustrates a total resource demand profile 300, which defines values for a total resource demand 302 for a given time period 304. FIG. 4 illustrates an operating profile 400 for the household device. The operating profile 400 defines an operating state 402 for a given time period 404. Typically the time periods 204, 304, and 404 (collectively, "given time period") define the same period of time.

In the present example, the operating state 402 comprise a voltage level 406 and, more particularly, a high level 408 and low level 410. The operating profile 400 has a number of peaks 412 and troughs 414 that represent the device states of the household device at times ($T_i$) over the given time period. The peaks 412 and troughs 414 define values for the high level 408 and the low level 410, respectively. For purposes of the discussion below, the peaks 412 identify a first state (e.g., an "on-state") and the troughs 414 identify a second state (e.g., an "off-state"). However, the distinction between the first state and the second state is not limiting in so far as the differences in the voltage levels 406 (e.g., the high level 408 and the low level 410) could identify the off-state and the on-state, respectively. Note further that while voltage is used in connection with the present example, the present disclosure also contemplates use of various other values (e.g., current, resistance, etc.) and like signals (e.g., analog and digital signals) that reflect changes in the operation and/or condition of the household device.

At a relatively high level, embodiments of the apparatus (e.g., the apparatus 102) can determine the resource demand profile 200 for a household device for a given time period, the resource demand profile 200 associating, for the given time period, the operating profile 400 of the household device with the total resource demand profile 300 for the household. In one example, the apparatus comprises executable instructions that are configured to be executed by a processor to correlate the peaks 412, where the household device may be in its on-state, to a value on the total resource demand profile 300. The executable instructions may also be configured so the processor can use this correlation to determine the value of the resource demand profile 200 at the times during the given time period where the peaks 412 are found. In addition to making this association for each of the peaks 412 over the given time period, the executable instructions may be configured to determine specific value for resource demand of the household device and, accordingly, generate the resource demand profile 300.

That apparatus can collect data that reflects the total resource demand profile 300 and the operating profile 400 over time such as over the course of a day, a week, a month, etc. From a practical standpoint, the executable instructions may encode one or more algorithms and/or statistical models that are useful for analysis, correlation, and/or association of this data. Because the executable instructions estimate values for the resource demand profile 200, the executable instructions may code various techniques such as least squares and regression analysis to determine the resource demand profile 200 from the total resource demand profile 300 and the operating profile 400. These techniques often determine the best-fitting curve (e.g., the resource demand profile 200) for the data that the apparatus collects.

Figure 5:
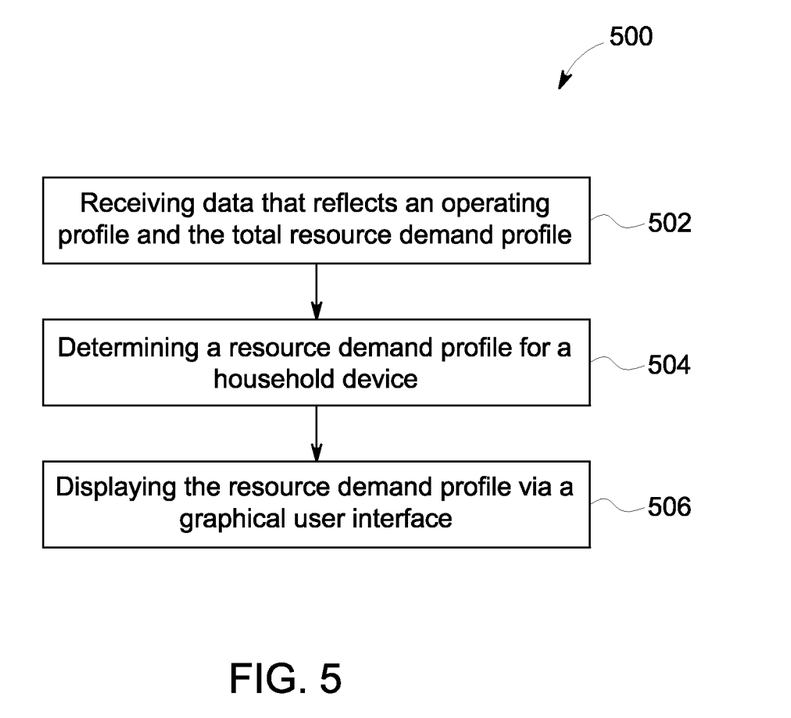
FIG. 5 depicts a flow diagram of an exemplary embodiment of a method for determining resource consumption for a household device.

FIG. 5 illustrates an example of a method 500 to determine resource use of a household device without direct measurement. One or more executable instructions can code the steps of the method 500. In the present example, the method 500 comprises, at block 502, receiving data that reflects an operating profile of the household device and the total resource demand profile for the household. The method 500 also comprises, at block 504, determining a resource demand profile for a household device for a given time period. In one example, the resource demand profile associates, for the given time period, an operating profile with the total resource demand profile. The method 500 further comprises, at block 506, displaying the resource demand profile via a graphical user interface.

In one embodiment, the method 500 can comprise (e.g., at block 504) an on-line least squares algorithm in accordance with Equation 1 below:

$$P_T = \theta'^* X,$$  Equation (1)

where $P_T$ defines the total resource demand for the household, $\theta$ defines the resource demand for the household device, and X defines the device state at times (e.g., times $T_i$ of FIG. 3) during given time period.

Figure 6:
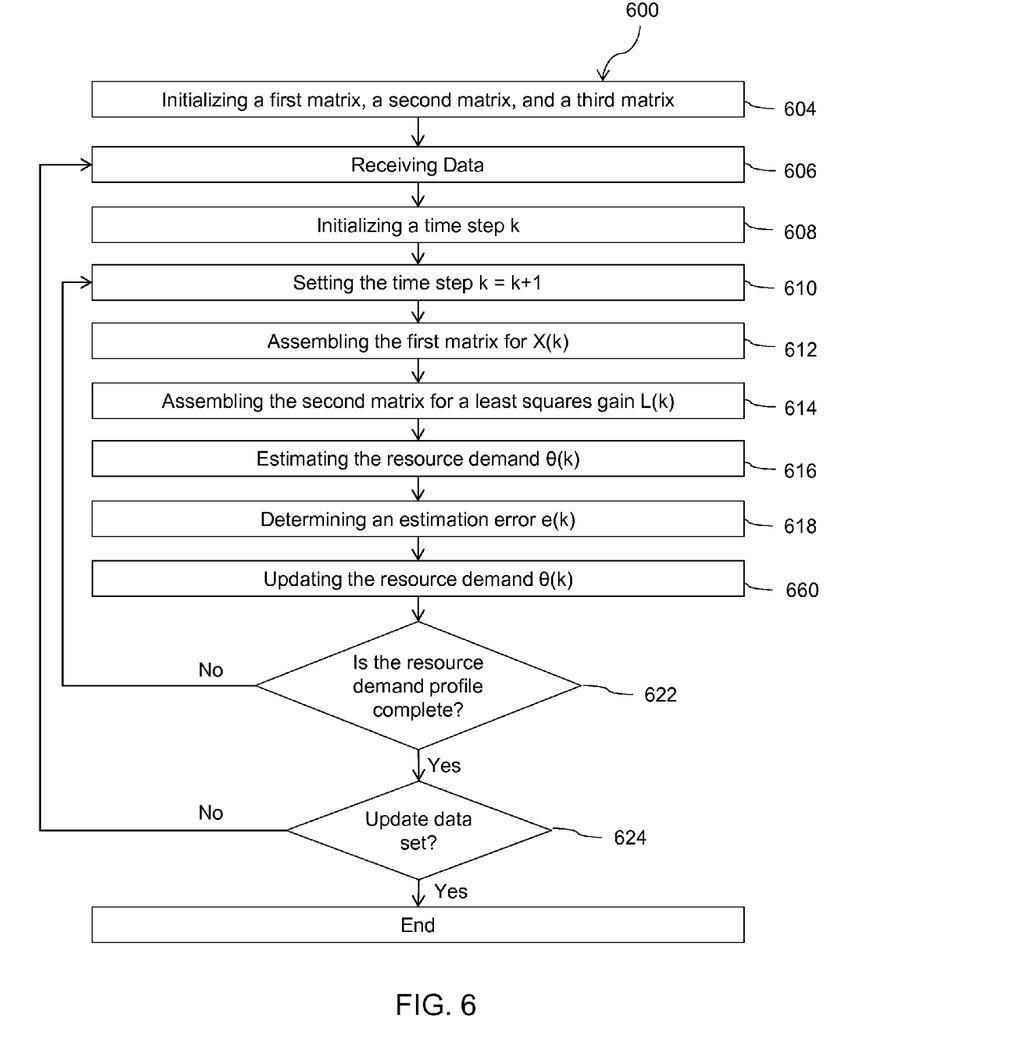
FIG. 6 depicts a flow diagram of an exemplary algorithm for use in a method for determining resource consumption for a household device.

FIG. 6 illustrates an example of method 600 that implements Equation 1. The method 600 comprises, at block 604, initializing a first matrix, a second matrix, and a third matrix and, at block 606, receiving data indicative of the total resource demand $P_T$ for the household, the operating state for the household device, and time $T_i$, e.g., time of day, day of week, etc. In addition, other data indicative of temperature of the environment such as the temperature inside and outside of a home can also be collected and can be used to identify the device state. The method 600 also comprises, at block 608, initiating a time step k and, at block 610, setting the time step k to a position in the matrices (e.g., the first matrix, the second matrix, the third matrix, etc.). The method 600 also comprises, at block 612, assembling the first matrix for data vector X(k) and, at block 614, assembling the second matrix for the least squares gain L(k).

Each of the matrices (e.g., the first matrix, the second matrix, and the third matrix) can define multiple locations at which data can be stored. To initialize the matrices, in one example the corresponding matrix is created of fixed size (e.g., the number of rows and columns is fixed) and with default initial values. As the matrix is populated, the values of the matrix will change, but the size will not. For example, each matrix may have one or more rows and one or more columns, with the intersection of each of the rows and columns identifying a location where one or more pieces of data reside. In one embodiment, the data vector X(k) comprises a plurality of entries indicative of the on-state for the household device, a plurality of entries as an indicator of the work-week hours of the day (e.g., 24 hours/day), and a plurality of entries as an indicator of the week-end hours of the day (e.g., 24 hours/day).

Examples of a matrix for the data vector X(k), for the theta vector $\theta(k)$, and the least squares gain vector L(k) are shown below in Tables 1, 2, and 3, respectively:

TABLE 1

| | |
|---|---|
| Fan On | 0 |
| AC On | 1 |
| Heat On | 0 |
| Hour of Day 0 | 0 |
| Hour of Day 1 | 1 |
| Hour of Day (i) | 0 |
| Hour of Day 23 | 0 |

TABLE 2

| | |
|---|---|
| Fan On Power | 1 |
| AC On Power | 1 |
| Heat On Power | 1 |
| Hour of Day 0 Power | 1 |
| Hour of Day 1 Power | 1 |
| Hour of Day (i) Power | 1 |
| Hour of Day 23 Power | 1 |

TABLE 3

| | | | | | | |
|---|---|---|---|---|---|---|
| 1 | 0 | 0 | 0 | 0 | 0 | 0 |
| 0 | 1 | 0 | 0 | 0 | 0 | 0 |
| 0 | 0 | 1 | 0 | 0 | 0 | 0 |
| 0 | 0 | 0 | 1 | 0 | 0 | 0 |
| 0 | 0 | 0 | 0 | 1 | 0 | 0 |
| 0 | 0 | 0 | 0 | 0 | 1 | 0 |
| 0 | 0 | 0 | 0 | 0 | 0 | 1 |

As FIG. 6 shows, the method 600 also comprises, at block 616, estimating the resource demand $\theta(k)$, at block 618, determining an estimation error e(k) and, at block 660, updating the estimate for the resource demand $\theta(k)$. The method further comprises, at block 622, determining whether the resource demand profile is complete. If the resource demand profile is not complete, indicated as "no" following block 622 of FIG. 6 (e.g., k equals a value that is not the last location in one or more matrices), then the method 600 continues, at block 610, and updates the time step k. On the other hand, if the resource demand profile is complete, indicated as "yes" following block 622 of FIG. 6 (e.g., k equals a value for the last location in one or more matrices), then the method 600 continues, at block 624, determining whether to update the data set. If the data set is not updated, indicated as "no" following block 624 of FIG. 6, then the method 600 continues, at block 606, receiving data indicative of the total resource demand $P_T$ for the household, the operating state for the household device, and time $T_i$, e.g., time of day, day of week, etc. If the data is updated, indicated as "yes" following block 624 of FIG. 6, then the method 600 ends.

One advantage of the method 600 is that it does not require large amounts of data. Instead the method 600 can any data set, which can in one example comprise the most recent data the apparatus collects to update the estimate of the resource demand profile, e.g., the resource demand $\theta(k)$. Updating of the data set can occur automatically and/or continuously during execution of the method 600 as desired. During such updates, the method 600 may use additional data that that apparatus (e.g., the apparatus 100 of FIG. 1) collects and that relates to the total resource demand for a time period that is different than the given time period. This new data may replace the older data in the matrices for purposes of determining the resource demand profile (e.g., at block 504 of FIG. 5). For example, a first set of data may be collected for a first time period and then a second set of data may be collected for a second time period. A delay may separate the first time period from the second time period. The delay can encompass any definable period (e.g., a second, a minute, an hour, etc.).

In one embodiment, the apparatus updates the data set in response to an input from the end user, which the end user can provide via a user interface or other interactive feature that the end user operates. In another embodiment, automatic updating causes the apparatus to collect data at regular intervals such as during known peak times, specific days of the year, as well as in response to outside stimulus (or inputs) such as temperature readings indicative of the indoor and/or the outdoor temperature of the environment.

As discussed above, the resource demand profile that results from embodiments of the methods 500 and 600 represents the best-fitting curve for the data set that is collected. Estimations often determine the data points for each location that makes up the resulting curve. In one embodiment, the method 600 may use a Kalman Filter, examples of which artisans skilled in the relevant statistical and mathematical arts will recognize as useful to determine the resource demand profile based on measurements observed over time.

In one embodiment, the estimation error e(k) is determined according to Equation 2 below, $$e(k) = P_T(k) - \theta'(k-1) * X(k). \quad \text{Equation (2)}$$

The resource demand $\theta(k)$ can be updated according to Equation 3 below, $$\theta(k) = \theta(k-1) + L(k)X(k)e(k), \quad \text{Equation (3)}$$

where L(k) identifies the least squares gain, which can be a constant value or a dynamic matrix. One example of a dynamic square matrix would be in accordance with Equations 4 and 5 below, $$P(k) = \frac{P(k-1) - P(k-1)X(k)X'(k)P(k-1)}{(1 + x'(k)P(k-1)x(k))}, \quad \text{Equation (4)}$$

$$L(k) = \frac{P(k)}{(1 + x'(k)P(k)x(k))}, \quad \text{Equation (5)}$$

Embodiments of the method 500 of FIG. 5 can incorporate all or part of the method 600 of FIG. 6. Moreover, the accuracy of the resource demand profile that results by changing and/or modifying how the apparatus (e.g., the apparatus 100) collects the data. For more accurate predictions of the resource demand profile, the apparatus updates to the data of sub-metering algorithm (e.g., the method 600) at slower sampling rate (e.g., on the order of every 1 minute). This sampling rate can be used when the household device operates as normal, e.g., in accordance with signals indicative of the operating states of the element being monitored. In an HVAC system, for example, normal operation is indicative of the control of the components of the HVAC system that occur by way of the thermostat, which monitors changes operation of the HVAC system in response to changes in an input (e.g., room temperature). The estimates the least squares method generates also converge slowly to the values that the resource demand profile reflects. The slower convergence provides a model of the resource demand profile for the household device that is more accurate than the faster converging models discussed below and, thus, provides the end user with more reliable information about energy use. This feature is beneficial, for example, for thermodynamic devices such as an HVAC system because the instantaneous demand of air conditioner compressors vary as the indoor and outdoor temperature varies. Estimates achieved over the longer time period consistent with this accurate mode are preferred over shorter time windows.

The methods 500 and 600 can also accommodate conditions when the speed of the estimate is important and, in some cases, the speed is more important than accuracy of the resulting demand profile for the household device. One example when this situation may be true is during start-up of an HVAC system, where the changes in operating state for the HVAC system occur less frequently because the HVAC system is operational until the room reaches the target temperature that the thermostat reflects.

To facilitate estimating the resource demand profile, the apparatus can control the household device by communicating an input which effectively cycles the household device through different operating states. Such cycling can permit updates to the data collected at a rate that is much faster than the slower, but more accurate, prediction that occurs through normal changes that are indicative of control by the thermostat alone. For example, the signal can cause cycling every 1 or 2 seconds, rather than every minute and/or in response to change in temperature as highlighted above.

The level of controls that the apparatus can implement is beneficial because the method 500 and 600 (and similar least squares methods) often rely on changes in the operating states of the household device to estimate the resource demand profile. For example, HVAC systems may include thermostats that operate in one of two modes. In one mode, the thermostat cycles the blower fan on and off with operation of the compressor (for cooling) and/or furnace (for heating). In another mode, the thermostat operates the blower fan continuously, which does not permit implementation of the methods 500 and 600 because there is effectively no change in operating state during the continuous operation of the blower fan. In one embodiment, the apparatus can take control of the blower fan, communicating a signal to the turn the blower fan on and off. The change in operation of the blower fan permits the estimation of the resource demand profile for the blower fan and, incidentally, the resource demand profile for the HVAC system as a whole.

Figure 7:
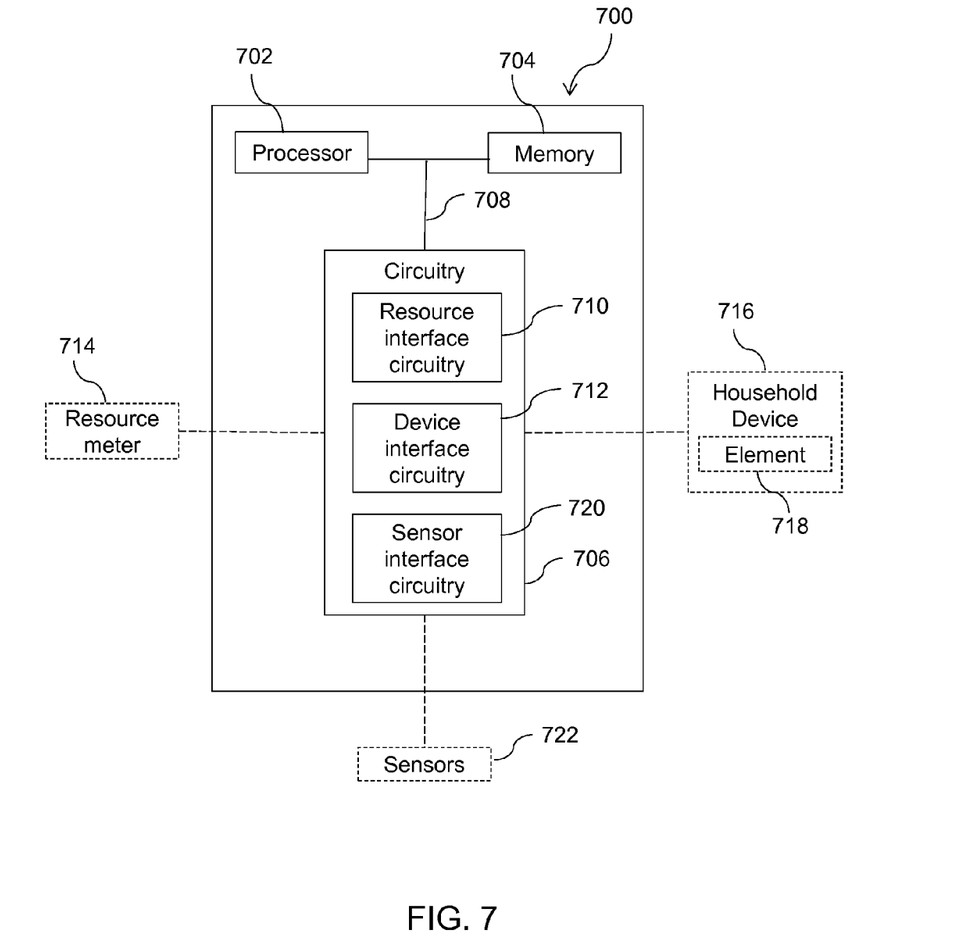
FIG. 7 depicts a schematic wiring diagram of a energy management device.

FIG. 7 illustrates a high-level wiring schematic of an exemplary embodiment of an apparatus 700 (e.g., the apparatus 100 of FIG. 1). Generally a variety of configurations can be used to implement the concepts of the present disclosure. The example of FIG. 7 provides a schematic diagram of one exemplary structure. In the present example, the apparatus 700 comprises a processor 702, memory 704, and circuitry 706, all coupled together with busses 708. The circuitry 706 may comprise a resource meter interface circuitry 710 and device interface circuitry 712 that interface with, respectively, a resource meter 714 (e.g., the resource meter 106 of FIG. 1) and a household device 716 (e.g., the household devices 104 of FIG. 1). In one example, the device interface circuitry 712 can be coupled with an element 718 (e.g., the element 108 of FIG. 1). The circuitry 706 can also comprise other configurations such as sensor interface circuitry 720 that can receive inputs from one or more sensors 722 (e.g., sensors 126 of FIG. 1) or other devices from which data can be collected.

Collectively the apparatus 700 executes high-level logic functions, algorithms, as well as firmware and software instructions. In one example, the processor 702 is a central processing unit (CPU) such as an ASIC and/or an FPGA. The processor 702 can also include state machine circuitry or other suitable components capable of receiving inputs from the circuitry 706 and/or directly from the resource meter 714 and the household device 716. The memory 704 comprises volatile and non-volatile memory and can be used for storage of software (or firmware) instructions and configuration settings. In some embodiments, the processor 702, the memory 704, and the circuitry 706 can be contained in a single integrated circuit (IC) or other component. As another example, the processor 702 can include internal program memory such as RAM and/or ROM. Similarly, any one or more of functions of these components can be distributed across additional components (e.g., multiple processors or other components).

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "service," "circuit," "circuitry," "module," and/or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As used herein, an element or function recited in the singular and proceeded with the word "a" or "an" should be understood as not excluding plural said elements or functions, unless such exclusion is explicitly recited. Furthermore, references to "one embodiment" of the claimed invention should not be interpreted as excluding the existence of additional embodiments that also incorporate the recited features.

This written description uses examples to disclose embodiments of the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An apparatus configured to monitor resource consumption of an appliance in a household, said apparatus comprising:
   a processor;
   a memory coupled to the processor; and
   one or more executable instructions stored on the memory and configured to be executed by the processor, the one or more executable instructions comprising instructions for:
   determining a resource demand profile for a household device for a given time period, the resource demand profile associating, for the given time period, an operating state profile of the household device with a total resource demand profile for the household.

2. The apparatus of claim 1, further comprising instructions for displaying the resource demand profile via a graphical user interface.

3. The apparatus of claim 1, wherein the device state comprises a voltage level for a relay switch.

4. The apparatus of claim 1, further comprising instructions for communicating with a thermostat.

5. The apparatus of claim 1, further comprising instructions for monitoring a temperature sensor, wherein the temperature sensor provides an input indicative of an indoor temperature and an outdoor temperature, and wherein the input identifies values for the operating state profile.

6. The apparatus of claim 1, further comprising instructions for communicating an input to the household device, wherein the input activates and/or deactivates the household device.

7. The apparatus of claim 1, wherein the given time period identifies at least one hour of operation of the household device.

8. An apparatus, comprising:
a processor;
a memory coupled to the processor; and
one or more executable instructions stored on the memory and configured to be executed by the processor, the one or more executable instructions comprising instructions for:
receiving data from a household device and a resource meter that measures a total resource demand for the household; and
applying a least squares method to the data to determine a resource demand profile for the household device,
wherein the resource demand profile associates, for a given time period, an operating state profile for the household device and a total resource demand profile.

9. The apparatus of claim 8, wherein the least squares method determines the values for the resource demand profile in accordance with:

$$P_T = \theta'^* X,$$

wherein $P_T$ defines the total resource demand for the household, $\theta$ defines the values for the resource demand for the household device, and X defines the device state during given time period.

10. The apparatus of claim 8, further comprising instructions for displaying the resource demand profile via a graphical user interface.

11. The apparatus of claim 8, further comprising instructions for automatically updating the data at a predetermined interval.

12. The apparatus of claim 8, further comprising instructions for sampling the data for the household and the household device at a sampling rate that is less than the given time period.

13. The apparatus of claim 8, wherein the least squares method determines an estimation error e(k) in accordance with:

$$e(k) = P_T(k) - \theta'(k-1)^* X(k),$$

wherein k is a time step, $P_T(k)$ defines the total resource demand for the household at the time step, $\theta(k-1)$ defines the values for the resource demand for the household device at the previous time step, and X(k) defines the device state at the time step.

14. The apparatus of claim 13, wherein the least squares method determines values for the resource demand profile in accordance with:

$$\theta(k) = \theta(k-1) + L(k) X(k) e(k),$$

wherein k is a time step, $\theta(k-1)$ defines the values for the resource demand for the household device at the previous time step, L(k) defines the least square gain at the time step, and X(k) defines the device state at the time step.

15. The apparatus of claim 14, further comprising receiving an input indicative of the given time period.

16. The apparatus of claim 14, wherein the household device comprise a thermostat.

17. A method, comprising:
at a remote device comprising a processor and memory:
determining a resource demand profile for a household device for a given time period, the resource demand profile associating, for the given time period, an operating state of the household device with a total resource demand profile for the household.

18. The method of claim 17, further comprising applying a least squares method to the data to determine a resource demand profile for the household device.

19. The method of claim 17, wherein the operating state is indicative of operation of an HVAC system.

20. The method of claim 19, wherein the household device comprises a thermostat.

* * * * *